United States Patent [19]
De Armas et al.

[11] Patent Number: 5,873,064
[45] Date of Patent: Feb. 16, 1999

[54] MULTI-ACTION VOICE MACRO METHOD

[75] Inventors: Mario E. De Armas, West Palm Beach; Harvey M. Ruback, Loxahatchee, both of Fla.

[73] Assignee: International Business Machines Corporation, Armonk, N.Y.

[21] Appl. No.: 746,426

[22] Filed: Nov. 8, 1996

[51] Int. Cl.$^6$ ................................. G10L 5/06; G06F 3/00
[52] U.S. Cl. ............................................ 704/275; 345/339
[58] Field of Search ...................................... 704/275, 243, 704/231; 345/120, 145, 339, 326, 340

[56] References Cited

U.S. PATENT DOCUMENTS

| | | | |
|---|---|---|---|
| 4,827,520 | 5/1989 | Zeinstra | 381/43 |
| 4,912,763 | 3/1990 | Galand et al. | |
| 5,096,423 | 3/1992 | Goldwasser | |
| 5,157,384 | 10/1992 | Greanias et al. | 340/706 |
| 5,168,548 | 12/1992 | Kaufman et al. | |
| 5,243,643 | 9/1993 | Sattar et al. | |
| 5,255,305 | 10/1993 | Sattar | |
| 5,287,102 | 2/1994 | McKiel, Jr. | 340/825.19 |
| 5,377,303 | 12/1994 | Firman | 704/275 |
| 5,386,494 | 1/1995 | White | 704/275 |
| 5,390,279 | 2/1995 | Strong | 395/2.52 X |
| 5,452,341 | 9/1995 | Sattar | |
| 5,461,399 | 10/1995 | Cragun | 345/145 |
| 5,534,887 | 7/1996 | Bates et al. | 345/120 |
| 5,588,044 | 12/1996 | Lofgren et al. | 379/67 |
| 5,621,880 | 4/1997 | Johnson | 345/326 |
| 5,623,592 | 4/1997 | Carlson et al. | 345/348 |
| 5,625,814 | 4/1997 | Luciw | 395/605 |
| 5,632,002 | 5/1997 | Hashimoto et al. | 704/231 |
| 5,636,995 | 6/1997 | Sharpe, III et al. | 434/317 |
| 5,657,246 | 8/1997 | Hogan et al. | 348/515 |
| 5,682,486 | 10/1997 | Grossman et al. | 345/339 |

FOREIGN PATENT DOCUMENTS 703580  3/1996  European Pat. Off. .

OTHER PUBLICATIONS

IBM® Technical Disclosure Bulletin, vol. 36, No. 09B, Sep., 1993, pp. 545–547; Ordered Group Manipulation Methodology via Configurable Model Bar.

IBM® Technical Disclosure Bulletin, vol. 38, No. 02, Feb. 1995, pp. 57–61; Voice Augmented Menu Automated Telephone Response System.

Research Disclosure RD–350014–A, Jun. 10, 1993.

(Abstract) Macros and Screen Access (computer use by the blind) {IN Proceedings of the Seventh Annual Conference "Technology and Persons with Disabilities", Proceedings of Conference. Technology and Persons with Disabilities, Los Angeles, CA, USA, Mar. 18–21, 1992}; Authors T. Henter; H.J. Murphy.

(Abstract) Mondrian: A Learning Graphical Editor {IN Informatique '92. International Conference Interface to Real and Virtual Worlds. Proceedings and Exhibition Catalog, Montpellier, France, Mar. 23–27, 1992}: Author: H. Lieberman.

(Abstract) Specification and Derivation of Process Networks {IN Unified Coputation Laboratory, Modelling Specifications, and Tools. Based on the Proceedings of a Conference, Stirling, UK, Jul. 3–6, 1990}; Author: F. Carrez; D. Mery; C. Rattray; R.G. Clark.

*Primary Examiner*—David R. Hudspeth
*Assistant Examiner*—Scott Richardson
*Attorney, Agent, or Firm*—Quarles & Brady

[57] ABSTRACT

Method for implementing a multi-action voice macro (140) for a voice recognition navigator program (102) on a computer system. The method involves analyzing a target application program (22) to determine a plurality of target application states (24). Each of the target application states (24) is comprised of a plurality of window objects. The target application states are arranged in the form of one or more sub-context trees, with each of the sub-context trees comprised of a plurality of sub-context objects (50, 52, 54, 56, 58, 60, 62, 64, 66, 68). A set of user inputs is determined to which each of the window objects will be responsive. Each user input is assigned a corresponding voice macro (140) which simulates the user inputs in response to a spoken utterance. The voice macro (140) includes a link field (148), which identifies at least one linked macro to be executed by the navigator program (102) when a specific vocabulary phrase for the voice macro (140) is spoken by a user.

14 Claims, 12 Drawing Sheets

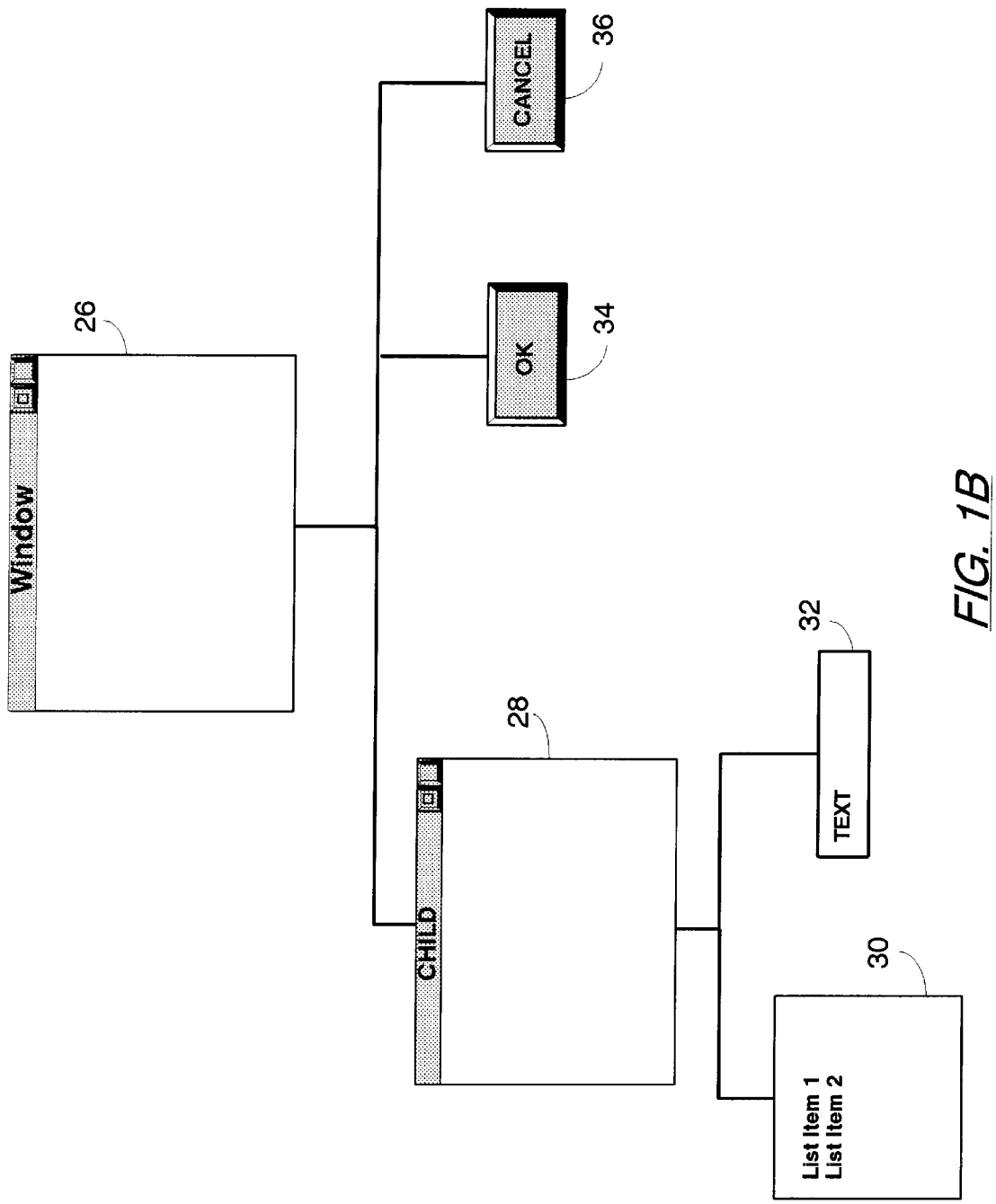

MULTI-ACTION VOICE MACRO METHOD

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer software systems and more specifically to a method for allowing a speech navigator to efficiently execute a plurality of functions, based upon only a single spoken command.

2. Description of the Related Art

In recent years, various software systems have been developed to enable an application program executing on a computer to recognize and respond to voice commands. Such programs are advantageously designed as independent or stand-alone systems which provide voice recognition capabilities to existing commercially available target application programs. Thus, sophisticated voice recognition capability can be economically made available for a wide variety of commercial application software, without modifying the existing source code of such application software.

Voice recognition systems are designed to allow user data to be entered in a target application program by means of spoken words (e.g. dictation of a report in a word processing application program). In addition, some systems also enable such target application programs to respond to voice commands for controlling the software (e.g., opening and closing windows, choosing program options, and causing the application software to perform certain functions). Systems which allow voice control of a target application program are sometimes called voice navigators. Significantly, the design of an independently developed voice navigator system, which is capable of associating voice commands with equivalent keyboard or mouse actuated control functions for a wide variety of commercially available application programs, has been hindered by certain difficulties.

Conventional voice navigation programs are typically designed to dynamically analyze a window object. This analysis is generally performed in order to determine a command vocabulary set for controlling such objects and their associated macros. In order to perform this dynamic analysis, there are several features of every window in a target application that the speech navigator can probe to determine the attributes of a particular object. These features include the (1) window class name, (2) window text, and (3) window identification number. The window class name indicates the type of the object (e.g., "BUTTON", "LISTBOX", "EDIT BOX", or "SCROLLBAR"). The window text feature is specific text associated with a window which allows a application program user to understand the function or relevance of a particular window. Conventional navigators will determine how to use the window text based upon the class name. For example, if the class name is "BUTTON" the window text of the button would be the words which would normally appear on the face of the button. Accordingly, the navigator would use the window text to determine the spoken command which can be used to activate the button. In other words, by probing the target application program regarding the window text, the navigator can associate certain spoken text to a particular button or control. Examples of window text might include words such as "OK" or "CANCEL" in the case of a push-button, or a list of items in the case of a list box. Finally, the navigator may also probe the application program for the window identification number as a way to internally distinguish controls which may otherwise look similar. The window identification number uniquely identifies a child window from other child windows having the same parent window.

In current voice recognition navigator systems, each voice command typically represents one user action. These actions could be a series of keystrokes, mouse click events, or other macro implementations. A macro is a single command phrase which causes a pre-recorded sequence of actions to take place. Typically the pre-recorded sequence of actions are keystrokes or mouse click events. One problem with conventional type dynamic analysis navigators is that their basic design does not easily permit macros associated with one user command to be combined with macros associated with other user commands. This is because, in the case of dynamic analysis navigators, a vocabulary set and its associated macros are available to a user only when a particular screen object associated with such vocabulary and macro is the foreground object. As a result, more complex, multi-step macros, must be provided for each window which can be acted upon, or a user must articulate multiple commands under circumstances where one command could otherwise be used. If additional multi-step macros are provided for each window object, it will have the undesired effect of increasing the amount of memory which is required to store the navigator program. Further, providing a large number of complex macros for each screen object to be controlled by a navigator program causes the program to be more complex, more expensive to develop, and more prone to errors. Alternatively, if a voice navigator is capable of responding only to single action type commands, the voice navigation process may become time consuming and tedious.

Accordingly, it would be desirable to allow a sequence of macros to be executed based on a single voice command. It would further be desirable to minimize the amount of memory required to store a navigator program containing macros, and render the development of such programs more efficient. Finally, it would be desirable to minimize the number of commands which must be articulated by a user in order to perform certain actions with a voice navigator.

SUMMARY OF THE INVENTION

A method for implementing multi-action voice macros by representing a target software application program to a voice recognition navigator program in the form of an internal object tree. Each application state of a target application program is defined as a set of window objects within the application for performing a specific user task. The application states are preferably represented as a sub-context tree comprised of a plurality of sub-context objects, with each sub-context object representing a corresponding window object. The tree allows the navigator to associate decoded spoken commands to specific window objects.

A set of attributes is assigned to each of the sub-context objects within the sub-context tree. These attributes can include, but are not limited to a window class name, a window identification number, a window text string, and a window enumeration index value for a corresponding window object. In addition, each sub-context object includes sub-context object name, a private vocabulary, and a sub-context command vocabulary. Each word or phrase comprising the sub-context object name, private vocabulary and sub-context command vocabulary is stored as part of an associated voice macro for causing a pre-determined sequence of actions to take place. The voice macro preferably includes a direct action field and a link field. The direct action field defines a direct action which is to be performed in response to a spoken command corresponding to the vocabulary phrase for the voice macro. If additional actions are to be performed beyond those specified in the direct action field, then the link field identifies at least one linked macro which is also to be executed by the navigator program when the vocabulary word or phrase for the voice macro is spoken by a user.

The voice navigator program preferably accesses the information stored in electronic memory as sub-context trees, in order to match a current target application state to a corresponding sub-context tree. The information stored in the sub-context tree can then be used to determine an active vocabulary set for the current target application state.

Once the active vocabulary has been retrieved by the voice navigator, it is preferably provided to a voice recognition engine software program, which will decode spoken utterances which correspond to the active vocabulary. Upon recognizing a spoken utterance. The voice recognition engine provides to the voice navigator a decoded phrase which is an element of the active vocabulary. The voice navigator program associates the decoded phrase with the sub-context object containing a vocabulary element corresponding to the decoded phrase.

When a voice command is received which matches a word or phrase contained within one of the sub-context vocabularies, the associated voice macro is activated. The navigator executes the direct action defined by the voice macro and then proceeds to execute the one or more additional linked macros. The linked macros may be stored within the same sub-context object as the voice macro or in other sub-context objects. These linked macros represent additional actions which are to be performed in conjunction with the direct action defined by the voice macro. Using the information contained in the voice macro, the navigator subsequently finds and activates the linked macros stored in other sub-context objects.

BRIEF DESCRIPTION OF THE DRAWINGS

There are presently shown in the drawings embodiments which are presently preferred, it being understood, however, that the invention is not limited to the precise arrangements and instrumentalities shown, wherein:

FIG. 1(B) is an example of a tree which shows the hierarchical relationship of the top-level window object in FIG. 1(A) to its children.

DETAILED DESCRIPTION OF THE INVENTION

The present invention shall be described with respect to a Windows based operating system. As used herein, the term Windows should be understood as referring to the Windows family of operating systems available from Microsoft Corporation. These include, but are not limited to 16-bit Windows, Windows NT™, and Windows 95™, It should be understood, however, that the invention as disclosed herein is not so limited. Instead, the invention can be used with voice navigators designed to operate with any one of several commercially available operating systems which incorporate a graphical user interface.

Figure 1A:
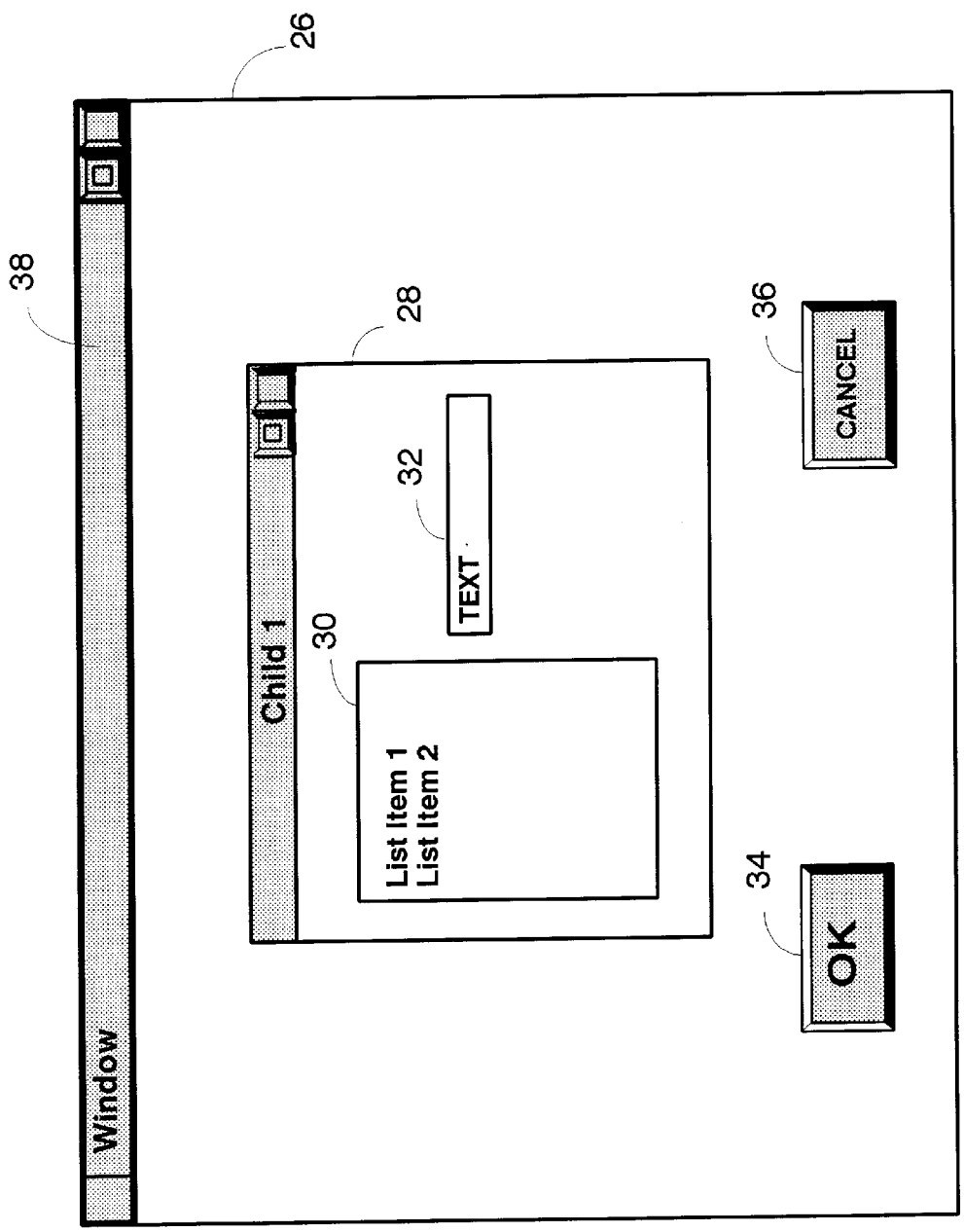
FIG. 1(A) is an example of a screen display for a top-level window object.

Each Windows based application contains one or more window objects. The term "window object" refers to a combination of computer code and data which together comprise a sub-part of each Windows based application, which is presented to a user as part of a graphical user interface on a user interface screen. The computer code for each window object generally defines what is to be displayed in a window on a user interface screen (such as a VDT) when the window object is executed, and determines the precise manner in which the window object will respond to user inputs. Each window object can contain one or more additional window objects. For example, a window object for an application program may contain therein, additional window objects such as buttons, text boxes, edit boxes, dialog boxes, etc. FIG. 1(A) illustrates a typical screen display for a top-level window object containing several additional window objects which are children of the top level window object.

When a conventional speech navigator is used in conjunction with an application program, it will permit a user to operate program controls and/or make selections from the various buttons, list boxes, edit boxes, etc., which appear within a window object which is presently the foreground window. In a Windows based operating system, a window object is indicated to be the foreground window when its window bar 38 is highlighted. The foreground window object is usually the one from which the user has most recently requested some action of the application program. It should be noted, however, that other types of operating systems may indicate the foreground window by other means. Thus, it should be understood that the invention is not limited in this regard.

According to a preferred embodiment of the invention, an internal representation of a particular target application program is preferably developed in the form of a hierarchical tree. This process is preferably performed by means of an analysis of a particular target application program for which a voice navigator system is to be used. The analysis occurs at several levels in order to sufficiently characterize the target application in a way that allows efficient voice navigation of the program. The hierarchical tree allows the voice navigator to have an internal representation of the manner in which every window object of a target application is associated with every other such object. For example, in FIG. 1(A), the screen display shown is for a top-level window object 26 of a target application state. As used herein, the term "top-level window object" may be understood as referring to a window object which has no parent window object, other than the Windows desk-top. Within the top level window object 26 are various other child window objects. In FIG. 1 (A), these include a window object 28, and buttons 34, 36. In addition, list box 30, and edit box 32 are children of window object 28. However, a child window object may include any type of window object other than a top-level window, and the invention is not limited in this regard. FIG. 1(B) is a simple example of a hierarchical tree for the top-level window object in FIG. 1(A).

Figure 2:
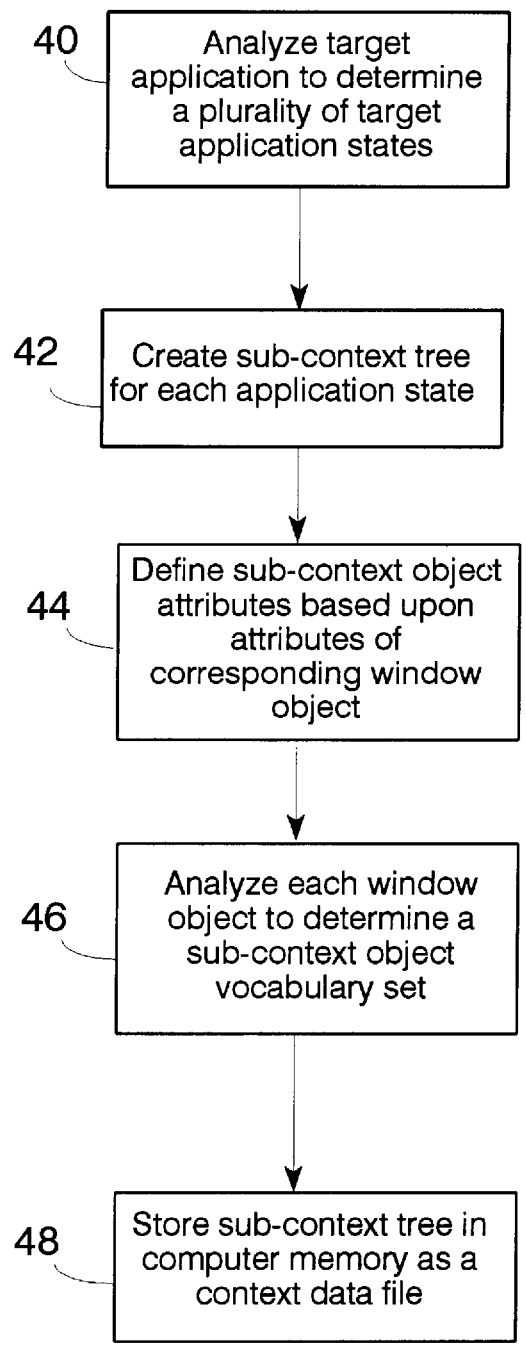
FIG. 2 is a flow chart illustrating the process for developing a sub-context tree for target applications according to the method of the invention.
Figure 3:
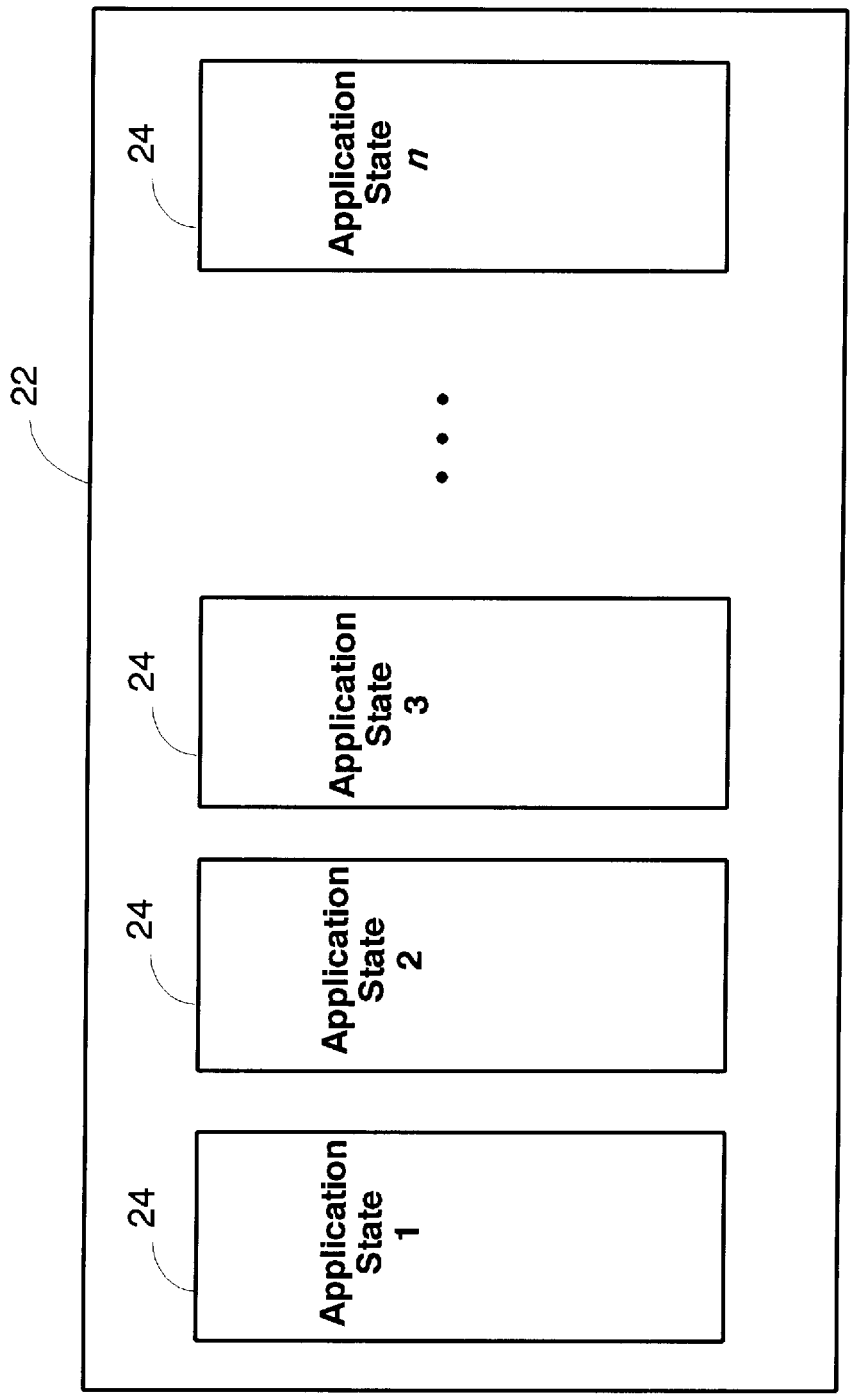
FIG. 3 is a block diagram showing an application program having a plurality of application states.

As shown in FIGS. 2 and 3, in order to develop a complete hierarchical representation of a target application 22, the target application is first analyzed in step 40 to determine a set of n application states 24. Each of the application states 24 is defined as a set of windows objects within the target application 22, which are generally associated with performing a specific user task. In a preferred embodiment according to the invention, the aforementioned plurality of application states 24 can be determined by a program developer alone or with the help of specifically developed software analysis tool.

The foregoing analysis can be performed in several ways, and the invention is not limited in this regard. In a preferred embodiment, the target application may be executed by a developer on a computer system, and by means of practices and methods which are well known to those familiar with this field, the developer will cycle the target application through all of its different states that represent a related group of user tasks. For each of the application states thus defined, software tools are preferably used to identify the window objects which comprise that particular state. This process will include identification of the parent-child relationship of the objects on the user interface screen, and the attributes of each object. The software tools which may be used for this purpose can be either commercially available programs designed for analyzing window attribute data, or custom programs specifically developed for performing such analysis.

Figure 4:
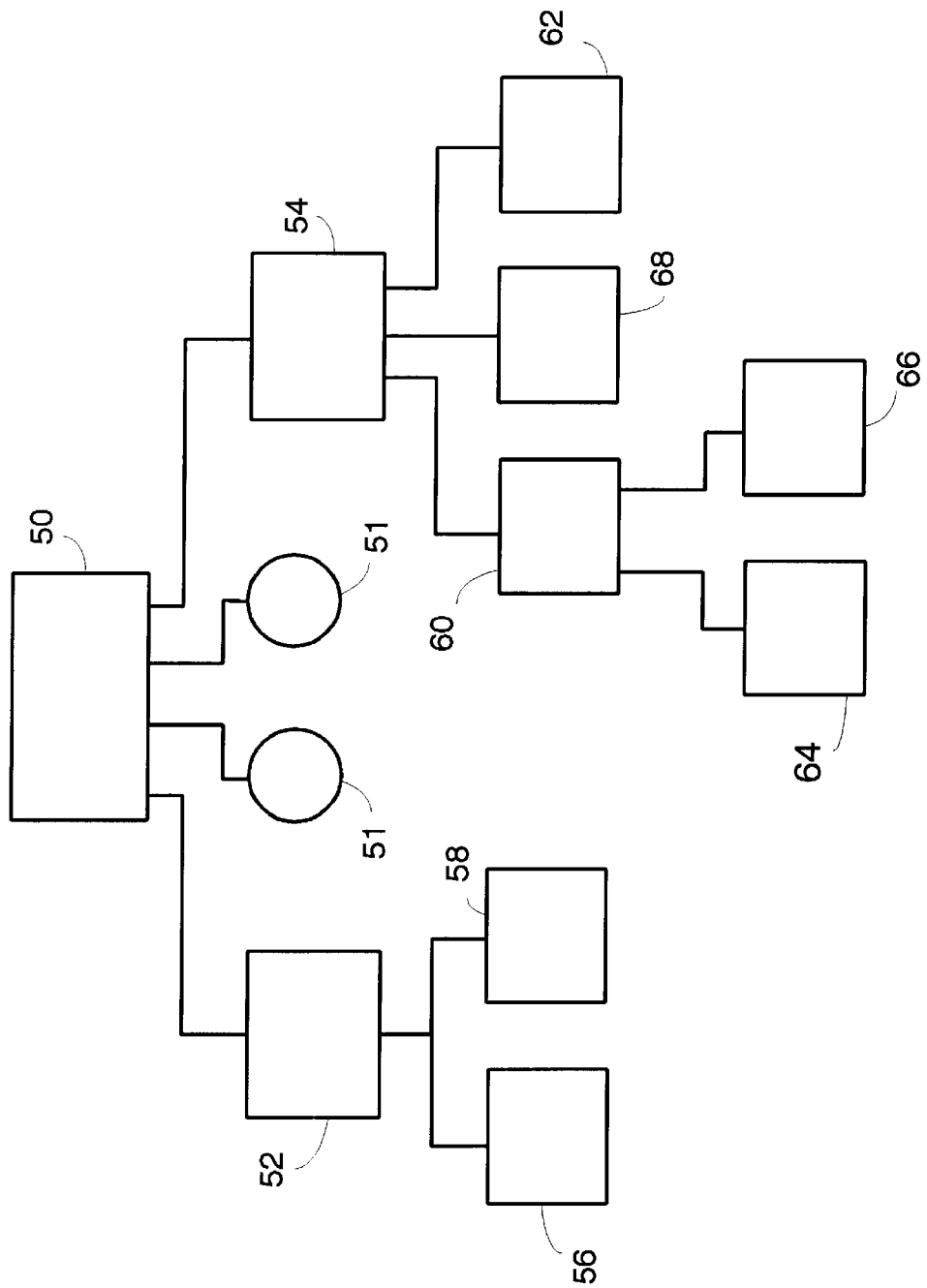
FIG. 4 is an example of a sub-context tree developed for one of the application states shown in FIG. 3.

In step 42, a target application sub-context tree is created for each application state 24. Each sub-context tree is preferably comprised of a plurality of sub-context objects. As explained in greater detail below, each sub-context object is preferably comprised of a data set which includes a plurality of sub-context attributes. In addition, each sub-context object preferably includes a plurality of vocabulary sub-sets, each being comprised of one or more macros which include a vocabulary word or phrase (hereinafter "vocabulary phrase"). In FIG. 4, a set of exemplary sub-context objects 50, 52, 54, 56, 58, 60, 62, 64, 66 and 68 are shown. The hierarchical relationship of the sub-context tree is chosen so that the parent-child relationship of the various sub-context objects is the same as the parent-child relationship between the window objects comprising each application state.

In addition, however, the sub-context tree may be designed so as to include additional branches with special sub-context action objects 51, which do not directly parallel the hierarchical parent-child relationship of any corresponding window objects. The sub-context action objects 51 include a set of attributes describing actions which are independent of said window objects of the current application state. For example, such sub-context actions may be comprised of macros which simulate user interface events. These can include, but are not limited to, simulated key strokes such as page up, page down, and customized messages that a particular window object in the target application will respond to.

Figure 5A:
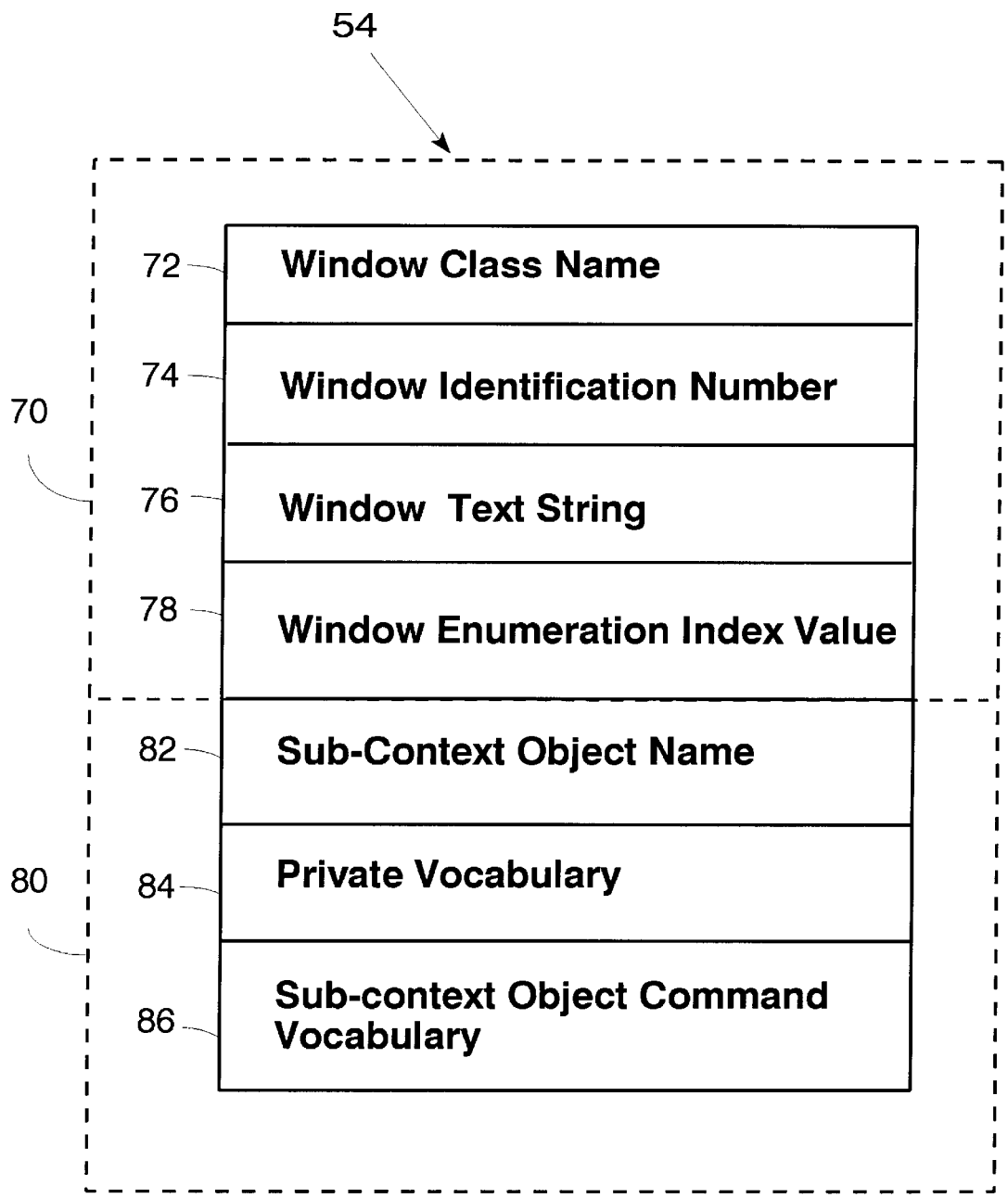
FIG. 5(A) is a representation of a sub-context object containing window attributes and a plurality of vocabulary sub-sets.

As the sub-context tree is created, a specific set of attributes 70 is defined for each of the sub-context objects based upon the attributes of a corresponding window object of the current application state. This process is illustrated in FIG. 2 as step 44. These attributes can include, but are not limited to a window class name 72, a window identification number 74, a window text string 76, and a window enumeration index value 78, as shown in FIG. 5(A). The window enumeration index value referenced above is the ordinal value of a child window in relation to its siblings. FIG. 5(A) is an example of a single sub-context object 54 which contains the foregoing attributes. However, it should be understood that each of the sub-context objects preferably contains similar information.

In addition to the foregoing analysis, each window object of the target application program is preferably analyzed to determine specific information regarding its functions. Each of the custom developed window objects of a target application is preferably mapped to a particular class or type of standard internal object which is understood by the voice navigator. For example, a developer may choose to develop a custom window object to replace a standard type of control such as a "BUTTON", "EDIT BOX", "LISTBOX", or "SCROLLBAR". If the custom control responds to the same messages and/or user inputs as a standard control, so that it is appropriate to treat the custom control as a standard control, then the custom control can be mapped, by means of information stored in the sub-context object, to one of the standard controls. Thus, the navigator can operate the control in the same manner as it would the standard control. This is an especially important feature as it concerns custom designed window objects which may have been implemented by the target application developer, but are not otherwise recognizable by a navigator program as a particular class or type of object. In particular, it avoids the need to write additional navigator computer code for handling the special or custom design controls implemented in a particular target application.

In addition to defining the foregoing sub-context attributes 70, each window object is preferably analyzed to discover a vocabulary set 80. More particularly, each window object is preferably analyzed to determine an appropriate set of spoken commands which must be uttered by a user in order to activate or act upon the object. This process is illustrated in FIG. 2 as step 46.

The sub-context object vocabulary set 80 is comprised of a series of vocabulary sub-sets. Each vocabulary sub-set is comprised of one or more macros which contain a vocabulary phrase corresponding to specific user inputs when a particular window object is the foreground window. These are the user inputs which must be recognizable by the voice navigator for the purpose of controlling the target application 22. As shown in FIG. 5, the sub-context object vocabulary set 80 preferably includes (1) a sub-context object name 82, which is the spoken command for activating the window object represented by the sub-context object; (2) a private vocabulary 84, which is active when the window object represented by the sub-context object is the foreground window; and (3) a sub-context object command vocabulary 86. The sub-context object command vocabulary corresponds to spoken navigation commands for window objects which are treated by the navigator as active, although the associated window object is not the foreground window.

Figure 5B:
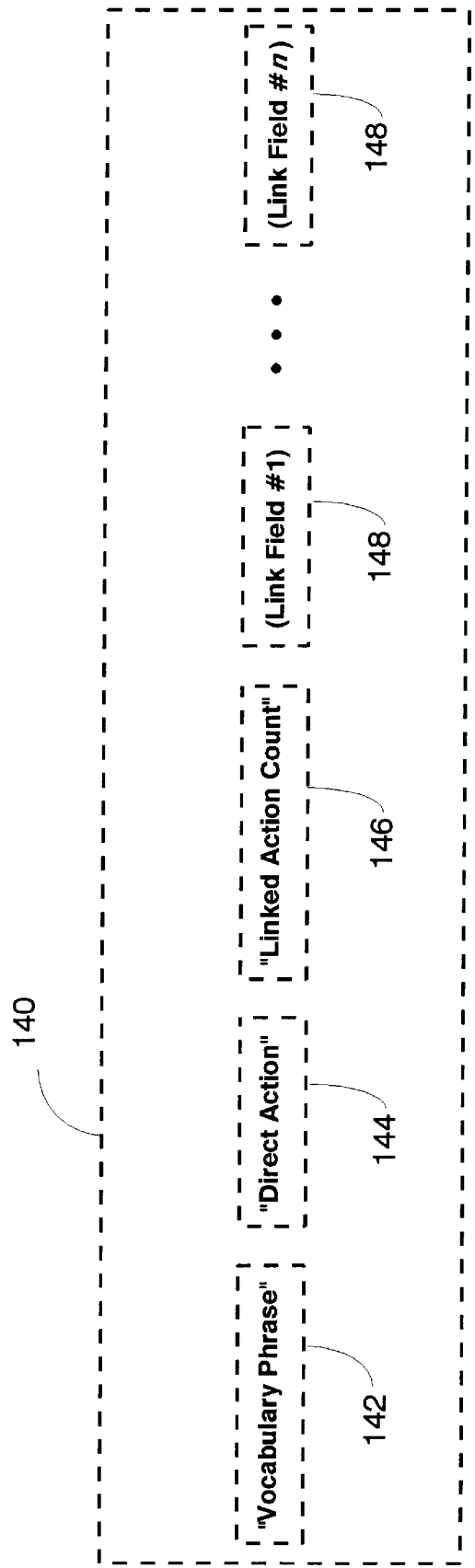
FIG. 5(B) is an example of a data structure for a multi-action voice macro.

Once the sub-context vocabulary set 80 has been defined, each word or phrase is preferably arranged within a macro format. More particularly, each vocabulary phrase defined within either the private vocabulary 84 or sub-context object command vocabulary 86, is preferably incorporated into a data structure or multi-action voice macro 140, as shown in FIG. 5(B). The multi-action voice macro 140 includes vocabulary phrase 142 which corresponds to a spoken user command which is recognizable by the navigator. In addition, the multi-action voice macro 140 defines a specific pre-determined sequence of actions to be performed when the vocabulary phrase 142 is spoken. This pre-determined sequence of actions preferably includes a direct action field 144 associated with the spoken vocabulary phrase, and a plurality of link fields 148 which identify to the navigator one or more linked macros to also be executed. Finally, a linked action count field 146 is preferably provided which indicates the number of additional linked actions which are included as link parameters 148.

The precise content of the direct action field 144 will depend to a large extent upon the particular type of window object represented by the sub-context object in which the multi-action voice macro 140 is contained. For example, if the sub-context object represents a window object which is an edit box, then the direct action field 144 will usually contain an appropriate text string which will be inserted by the voice navigator in the edit box when the a user speaks the vocabulary phrase 142. Alternatively, it the sub-context object represents a window object which is a list box, then the direct action field would most likely contain a character string which corresponds to one of the items available in the list box. Significantly, it should be noted that the foregoing examples are not intended to limit the scope of the invention, and the direct action field 144 can contain any other type of direct action information which is appropriate for a particular vocabulary phrase 142.

Figure 5C:
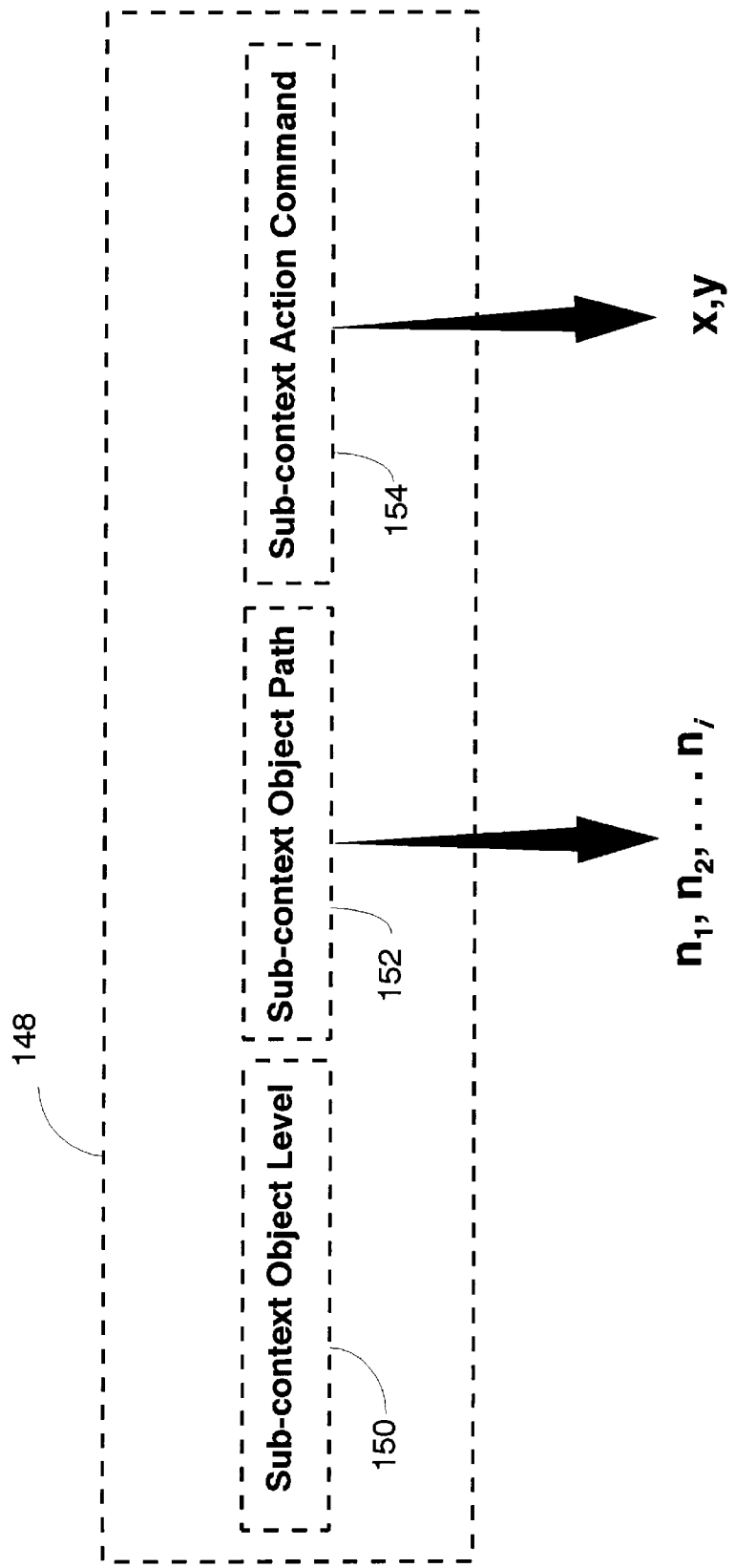
FIG. 5(C) is a example of a data structure for a link field.

Each of the link fields 148 preferably contains information sufficient to allow the navigator to locate one or more linked macros contained in other sub-context objects. In a preferred embodiment, the link fields 148 are defined as shown in FIG. 5(C). As shown therein, each of the link fields 148 is preferably comprised of three link parameters which include a sub-context object level 150, a sub-context object path 152, and a sub-context action command 154. The sub-context object level 150 is preferably a number which identifies the level within a sub-context tree, of a sub-context object containing a macro to be performed. The sub-context object path 1 52 identifies the path the voice navigator must follow, starting from the root of the sub-context tree, to locate the sub-context object containing the linked macro to be performed. In a preferred embodiment, the sub-context object path is comprised of a series of digits $n_1, n_2, \ldots n_i$ which identify the ordinal value assigned to each sub-context object at each level along the path. The number of digits contained in this field (i.e., the value of "i" in the progression) will depend upon the level where the sub-context object containing the linked macro is located. For example, if a sub-context object containing the linked macro is located on level two (2) of the sub-context object tree, then the sub-context object path field will contain only two digits. Alternatively, if the sub-context object is on level three, then the object path field will include 3 digits.

Thus, if the linked macro was located in sub-context object 66 in FIG. 4, the sub-context object level 150 would be 3 (the root of the tree is the zero level). The sub-context object path 152 in this case would be "3, 0, 1". As with the level designation, the ordinal value count preferably begins from zero.

Finally, the sub-context action command 154 is preferably comprised of two digits which, for convenience shall be referred to herein as x and y. The variables x and y are defined as the major function value and the minor function value, respectively. These values identify the specific linked macro to be activated within the sub-context object identified by the link field 148. The major function value x identifies whether the specific macro to be activated is the sub-context object name 82 (x=1), is a macro which resides in the private vocabulary 84 (x=2), or is a macro residing in the sub-context object command vocabulary 86 (x=3). The significance of the minor function value y is dependent upon the value of the major function value x. For example, if the major function value is equal to 1, indicating that the macro to be activated is the macro associated with the sub-context name 82, then the minor function value is not important. This is so because there is typically only one default macro for the sub-context name 82. On the other hand, if the major function value is equal to 2 or 3, it indicates that the macro to be activated is associated with the private vocabulary 84 or the sub-context vocabulary 86 of the sub-context object. In such case, the minor function value y designates the ordinal value of the macro to be activated within the private vocabulary 84 or sub-context object command vocabulary 86. Once the sub-context object tree has been constructed in the foregoing manner, each of the sub-context trees is stored in an electronic memory device as a context data file in a computer system. This process is illustrated in FIG. 2 as step 48.

Figure 6:
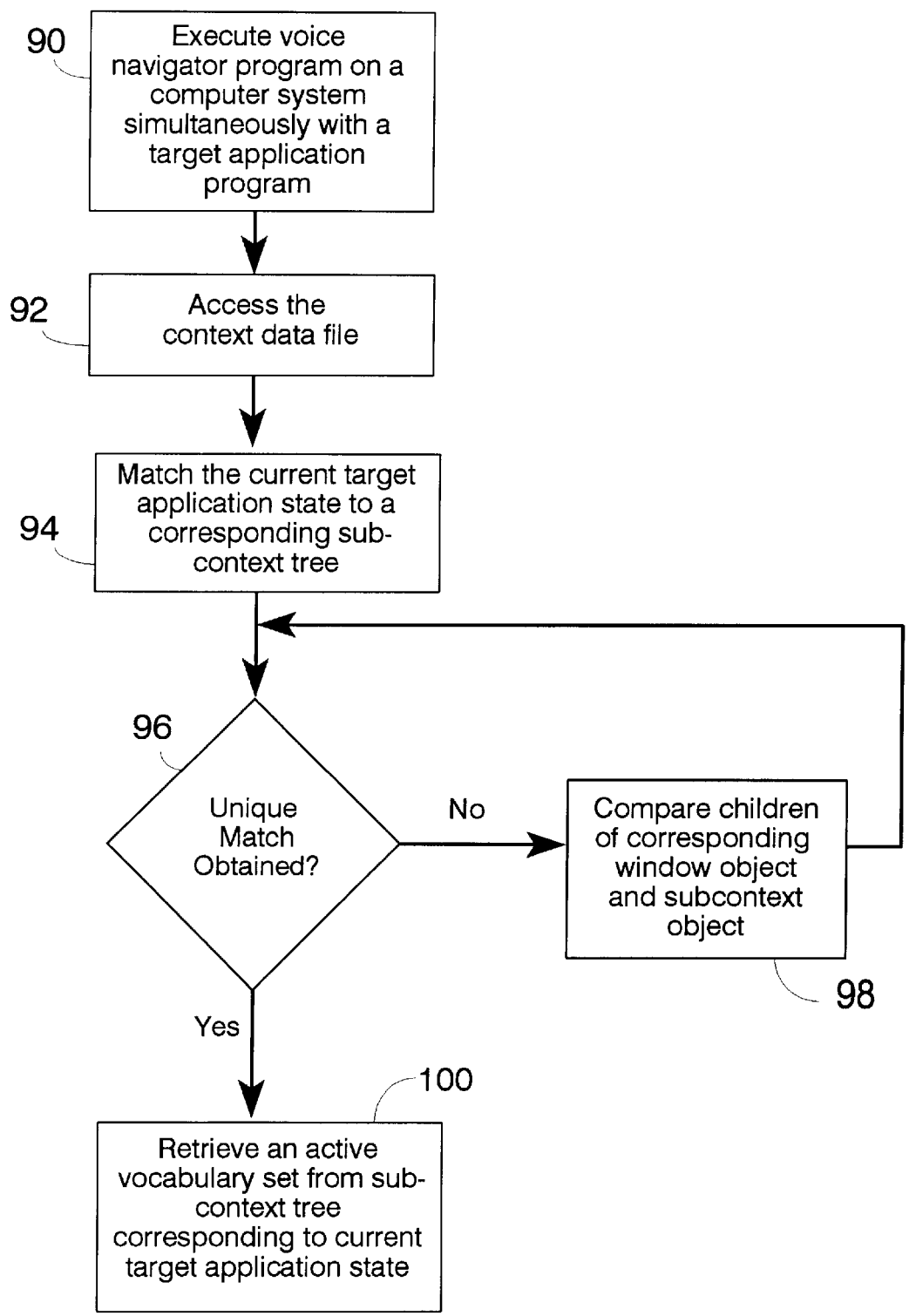
FIG. 6 is a flow chart showing the manner in which a voice navigator program makes use of a context data file.

One of the purposes of the foregoing context data file is to enable a voice navigator to associate decoded spoken commands to specific window objects. FIG. 6 is a flow chart which illustrates the manner by which a voice navigator program makes use of the context data file to locate a window object to which a voice command has been directed. As shown in FIG. 6, the voice navigator program is preferably executed on a computer system simultaneously with the target application program in step 90. In step 92, the voice navigator program accesses the context data file to retrieve information stored in the sub-context trees concerning the structure, attributes and vocabulary associated with the target application program. This information is used in step 94 to attempt to match a current target application state to a corresponding sub-context tree to determine an active vocabulary which has been defined for the current target application state. The matching step 94 is preferably performed first by attempting to match a window object from the current application state to a first or top-level sub-context object from each of the sub-context trees. More specifically, the navigator program attempts to match a set of window attributes of the top-level window object of the target application program, to a set of attributes of one of the top-level sub-context objects contained within the sub-context tree. In some cases, the navigator will locate a unique and unambiguous match. In other cases, however, it will be impossible for the navigator program to uniquely and unambiguously match a window object to its corresponding sub-context object. This can occur under circumstances where two window objects, and two corresponding sub-context objects, share a common set of attributes. In such cases, the outcome of decision step 96 will be negative and the navigator will proceed further by attempting to obtain a unique match in step 98. In step 98, the navigator compares a set of window objects which are children of the top-level window object to a set of sub-context objects which are children of the top-level sub-context object. As shown in FIG. 6, the navigator continues to compare the respective children of the window object and the sub-context object until a unique match is found.

Figure 7:
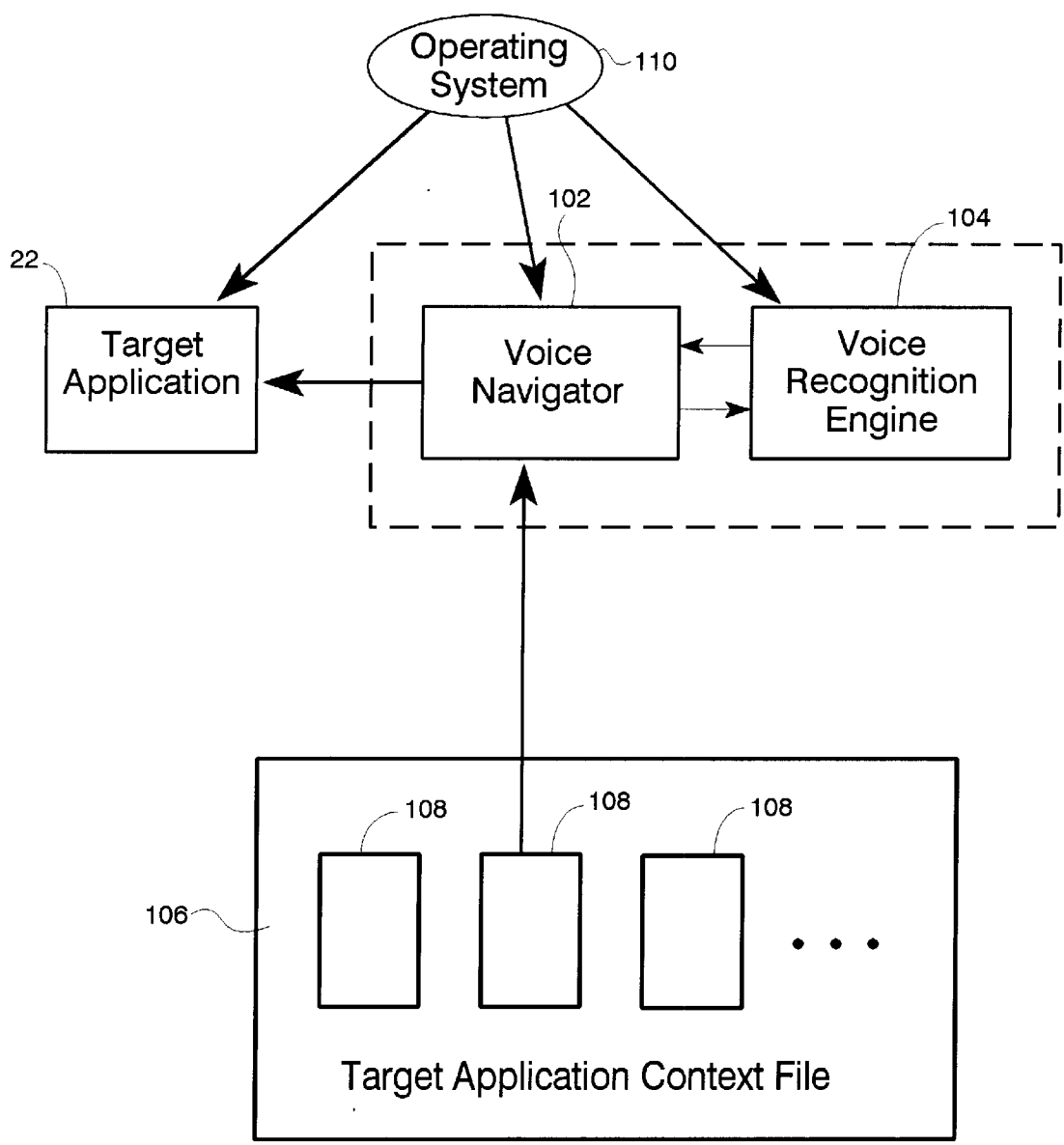
FIG. 7 is a block diagram showing the interaction between a voice navigator program, voice recognition engine and a target application context file.

Finally, in step 100 an active vocabulary set is obtained from the sub-context tree which corresponds to a current application state. This step is illustrated in FIG. 7, which is a block diagram showing the interaction between a voice navigator 102, voice recognition engine 104, target application context file 106, and target application 22. According to a preferred embodiment of the invention, an active vocabulary set for the current target application state is obtained by retrieving and combining one or more sub-context object vocabulary sets 80 contained within each sub-context object of a current sub-context tree 108.

Once the active vocabulary set has been retrieved by the voice navigator 102, it is preferably provided to the voice recognition engine 104. The voice recognition engine software preferably operates in conjunction with the voice navigator software and can be part of the same application program. The voice recognition engine 104 receives user inputs from a computer operating system 110 in the form of electronically detected spoken utterances. Upon recognizing a spoken utterance which is part of the active vocabulary, the voice recognition engine 104 provides to the voice navigator a decoded phrase which is an element of the active vocabulary set. In addition to the decoded phrase, the voice recognition engine can preferably provide other types of information to the voice navigator, which can be used for aiding the voice navigator in determining how the decoded phrase is to be used.

As shown in FIG. 8, after receiving the decoded phrase in step 110, the voice navigator program matches it in step 112 with the sub-context object in the current application state containing a vocabulary element (a word or combination of words) corresponding to the decoded phrase. This process may be accomplished in various ways, and the invention is not limited in this regard. However, in a preferred embodiment, the navigator will perform a prioritized search, wherein the private vocabulary 84 corresponding to the foreground window object is checked first for a vocabulary word which matches the decoded word or phrase received from the voice recognition engine. Subsequently, the voice navigator will preferably compare the decoded word or phrase against the sub-context object name 82 and the sub-context object command vocabulary 86. Finally, the navigator will search all of the remaining sub-context object names 82 for other sub-context objects in the current sub-context object tree.

Once the navigator has matched the decoded word or phrase to a particular vocabulary phrase 142 contained within the target sub-context object, the desired action represented by the decoded phrase within the sub-context object must be performed by the navigator 102. As explained above, each vocabulary word or phrase 142 is stored as part of a macro which includes a direct action 144, and a ink field 148 which informs the navigator how to locate a linked macro. Accordingly, upon locating the proper vocabulary phrase, the navigator 102 first executes the direct action 144. This is accomplished by comparing the target sub-context object to a window object of the current application state to obtain a unique window handle for the window object.

Figure 8A:
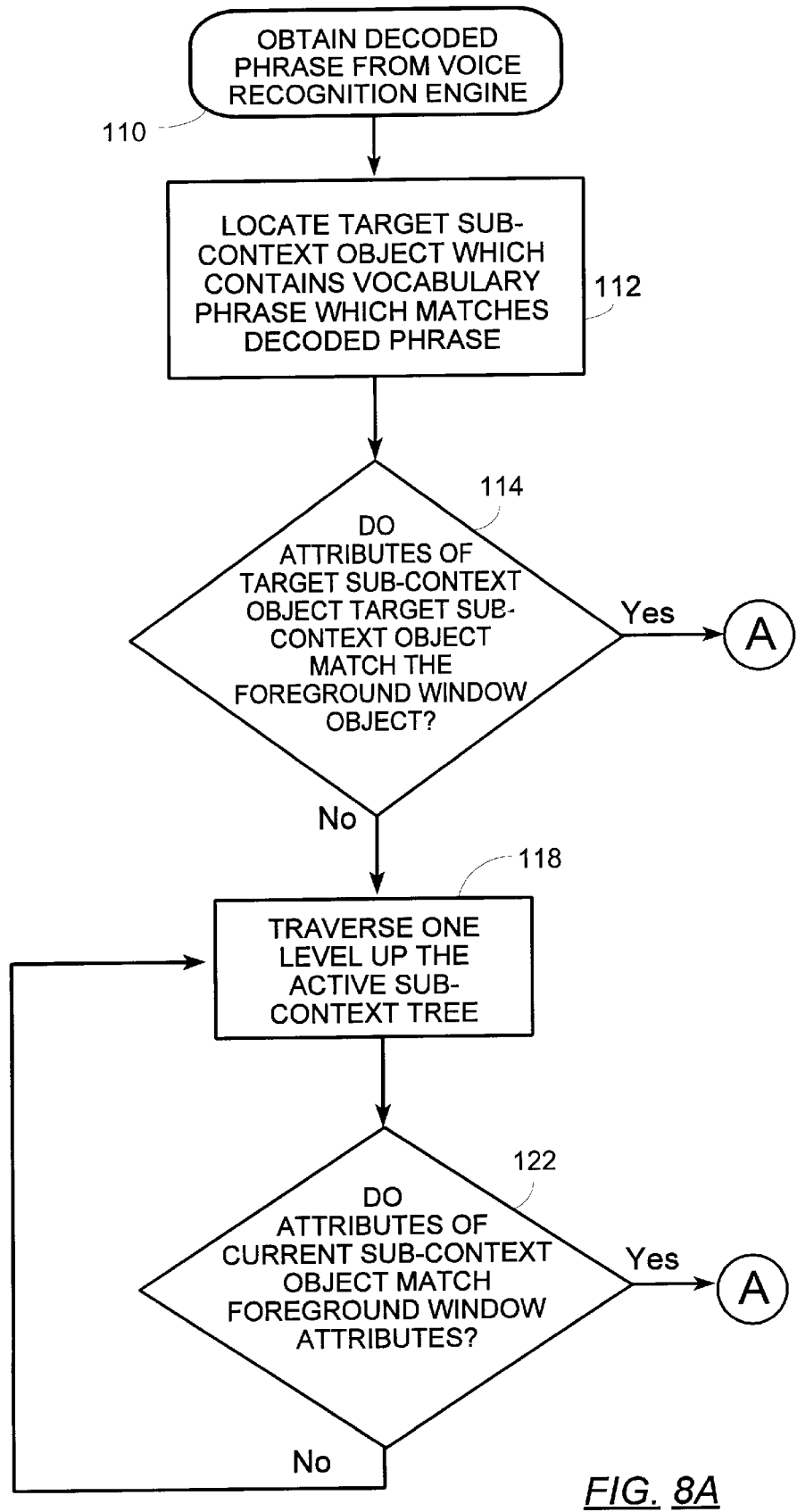
FIG. 8(A) is a flow chart showing the process by which a voice navigator according to the present invention can locate a target window object, based upon a decoded phrase.

In a preferred embodiment, the window handle for the window object which corresponds to the target sub-context object is determined as shown in FIG. 8(A) and (b). In step 114, the navigator compares the attributes of the target sub-context object with the attributes of the foreground window. In order to understand what is meant by the term "foreground window", it is helpful to have some background regarding the concept of z-order and the manner in which the Windows operating system organizes the various window objects which may appear on a user interface screen. The z-order of a window identifies a window object's position in a stack of overlapping windows on the user interface screen. The window stack is oriented along an imaginary axis, extending outwardly from the screen. The foreground window is the window at the top of the z-order. It is the window that the user is working with at a particular moment.

If the attributes of the target sub-context object do not match the attributes of the foreground window, the navigator traverses up 1 level of the active sub-context tree in step 118, to the parent of the target sub-context object. The attributes of this next higher level sub-context object are then compared to the foreground window's attributes in step 119. Again, if there is no match, the process of traversing up the active sub-context tree to the parent object is repeated until a foreground sub-context object which matches the foreground window, is found.

Figure 8B:
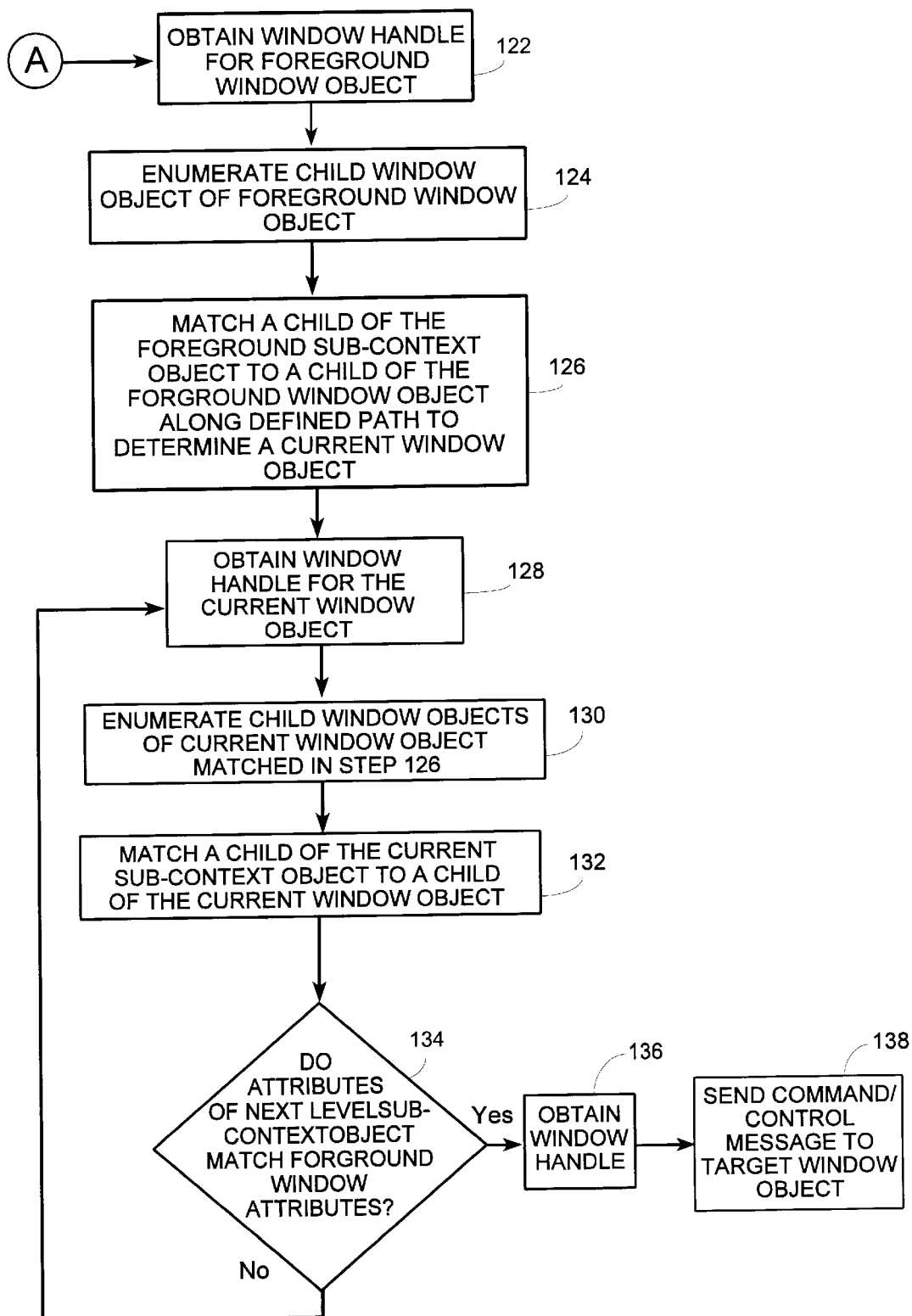
FIG. 8(B) is a continuation of the flow chart of FIG. 8(A).

As the navigator traverses up the sub-context tree, the path between the nodes defined by the target sub-context object and the foreground sub-context object is stored. This can be accomplished by various means and the invention is not limited in this regard. For example the navigator may rely upon recursive function calls or the stack data structure maintained by the navigator program to create a record of the path which has been traversed. Once this path has been established, the navigator begins traversing its way back down the sub-context object tree on the path previously defined, as shown in FIG. 8(B).

As the navigator traverses the defined path away from the foreground sub-context object, each descendent of the foreground sub-context object along that path is matched to its associated windows object, which is a descendent of the foreground window. In step 122, the navigator obtains a window handle for the foreground window object. Using this information, the navigator can utilize available operating system functions to enumerate the child window objects of the foreground window in step 124. The navigator then matches a child of the foreground sub-context object to a child of the foreground window object to determine a current window object in step 126. The enumeration and matching process is repeated in steps 128, 130 and 132 for each descendent of the foreground window along the defined path. As each level of the tree is downwardly traversed by the navigator, it checks to determine whether the current window object matches the target window object. If it is, then the window handle for that target window object is obtained in step 136.

Once the window handle has been obtained for the window object which corresponds to the target sub-context object, the navigator can invoke the function associated with the spoken command by sending one or more messages to the associated window object, using the acquired window handle and the information contained in the direct action field 144 of multi-action voice macro 140. This process is shown in step 138. The specific types of messages which the navigator sends will depend upon the particular window object and the spoken utterance.

The matching step described above is preferably accomplished by comparing the attributes of each descendant sub-context object to the attributes of each of the enumerated descendent window objects. No ambiguity among child or descendent windows occurs in this instance because the navigator's combined knowledge regarding window object attributes and the window object's specific parent, allows each child window object to be uniquely determined.

It should be noted that the window handle is an essential piece of information which is necessary to allow the associated window object to be uniquely identified. The window handle is a dynamic, instance specific, operating system identification number, which permits a window object to be uniquely identified within the operating system at any given moment in the execution of the target application.

As an example of the foregoing process, consider the case where the target sub-context object is sub-context object 66. The navigator will first traverse the sub-context tree upwardly from sub-context object 66, one level at a time, until it finds a match between a sub-context object and the current foreground window object. For the purposes of the present example, this would be sub-context object 50. The navigator searches for the current foreground window object first because it is the only window handle which is easily accessible. However, once provided with the window handle of the foreground window object, the navigator traces its way back down the sub-context object tree along the same path, at each level requesting the window handle for the child windows objects. This process is repeated until the window handle is obtained for the window object corresponding to the target sub-context object 66.

Once the navigator executes the portion of the voice macro 140 contained in direct action field 144, it then proceeds to perform any additional actions specified as linked macros in link field 148. Using the information contained in the link field 148, the navigator traverses the current sub-context tree to locate the linked macro. More particularly, the navigator uses the sub-context object level 150, sub-context object path and sub-context action command to find the linked macro. Upon locating such linked macro, the navigator engages in a process of matching the sub-context object where the linked macro resides, to a specific window object. This matching process is accomplished in the same manner as described above for the purposes of implementing the direct action 144.

Significantly, it should be noted that while the invention has been described in terms of a single linked macro, the invention is not limited in this regard. As shown in FIG. 5(B), the link field may designate a plurality of linked macros which are to be executed based upon a single vocabulary phrase 142. Likewise, the linked macros may themselves include link fields which cause the navigator to automatically execute additional macros in response to a single voice command. Thus, a voice navigator utilizing the present method is capable of executing a series of macros associated with one or more window objects based upon a single voice command.

In view of the foregoing, it should be apparent that the method according to the invention is designed to operate in conjunction with a computer system comprising a central processing unit, one or more electronic memory storage devices, data entry equipment such as a microphone, keyboard and mouse, and at least one user interface unit (e.g., CRT). The central processing unit (or CPU) is electronically coupled to the one or more electronic memory storage devices, data entry device and display unit by suitable means which are well know by those of ordinary skill in this field. Similarly, the CPU can be comprised of any suitable microprocessor or other electronic processing unit as is well known to those skilled in the art. An example of such a processor would include the Pentium brand microprocessor available from Intel Corporation or any similar unit such as a 586, 486 or 386 type microprocessor.

The various hardware requirements for the computer system as described herein can generally be satisfied by any one of many commercially available high speed personal computers offered by manufacturers such as Compaq, Hewlett Packard, or IBM Corp. Likewise, the system as disclosed herein can be implemented by a programmer using development tools for the operating systems described above.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. A method for implementing a multi-action voice macro for a voice recognition navigator program on a computer system, said method comprising the steps of:

scanning a target application program to determine a plurality of target application states, each of said target application states being comprised of a plurality of window objects;

organizing each of said target application states in the form of a sub-context tree, each of said sub-context trees being comprised of a plurality of sub-context objects, said sub-context tree defining a hierarchical relationship among said sub-context objects;

determining a set of user inputs to which each of said window objects will be responsive, and assigning a corresponding set of said voice macros to each of the sub-context objects for simulating each of said user inputs in response to a spoken utterance;

defining each of said voice macros to include a vocabulary phrase, said vocabulary phrase defining the spoken utterance to which each of said voice macros is responsive;

further defining at least one of said voice macros to include a link field, said link field identifying at least one linked macro to be executed by said navigator program when the vocabulary phrase for said voice macro is spoken by a user, said link field comprising a sub-context object path from the root of said sub-context tree, to the sub-context object containing said linked macro;

storing the sub-context trees in an electronic memory device as a context data file;

executing said voice recognition navigator program on said computer system simultaneously with said target application program so that a spoken utterance corresponding to said vocabulary phrase will cause said linked macro to be executed.

2. The method according to claim 1 wherein each of said voice macros is further defined to include a direct action field, said direct action field determining a direct action to be performed in response to a spoken utterance corresponding to the vocabulary phrase for said voice macro.

3. The method according to claim 1 further comprising the steps of:

determining a set of attributes associated with each of said window objects, and assigning a matching set of attributes to each of the sub-context objects; and matching a current target application state to a corresponding sub-context tree to determine an active vocabulary set for the current target application state, said active vocabulary set comprised of a plurality of said voice macros.

4. The method according to claim 1 wherein said sub-context object path is defined by a series of digits in said link field which identify the ordinal value assigned to each sub-context object, relative to the sub-context object's parent, at each level along the path.

5. The method according to claim 1 wherein said link field is further defined to include a sub-context object level for identifying the level within said sub-context tree at which the sub-context object containing said linked macro can be found.

6. The method according to claim 1 wherein said link field is further defined to include a sub-context action command for identifying the location of said linked macro within the sub-context object containing said linked macro.

7. The method according to claim 6 wherein said sub-context action command is defined to include a major function value which identifies a vocabulary set containing said linked macro.

8. The method according of claim 7 wherein said sub-context action command is further defined to include a minor function value, said minor function value indicating the ordinal value of said linked macro within said vocabulary set.

9. The method according to claim 6 further comprising the step of executing said direct action represented by the decoded phrase.

10. The method according to claim 9 wherein said step of executing said desired action represented by the decoded phrase is performed by said navigator program by matching said target sub-context object to a target window object of the current target application state.

11. The method according to claim 9 further comprising the step of executing said linked macro.

12. The method according to claim 11 wherein said step of executing said linked macro is performed by said navigator program by the steps of:

locating said linked macro in said sub-context tree based upon said sub-context object path, sub-context object level, and sub-context object action command;

matching the sub-context object containing said linked macro to a target window object of the current target application state.

13. The method according to claim 1, wherein each of said target application states is defined as a set of window objects for performing a specific user task.

14. The method of claim 1, wherein said target application sub-context tree is organized in a tree structure wherein the parent-child relationships between sub-context objects is the same as the parent-child relationships between the corresponding target application window objects.

* * * * *

UNITED STATES PATENT AND TRADEMARK OFFICE
CERTIFICATE OF CORRECTION

PATENT NO. : 5,873,064
DATED      : February 16, 1999
INVENTOR(S): Mario E. De Armas and Harvey M. Ruback It is certified that error appears in the above-identified patent and that said Letters Patent is hereby corrected as shown below:

Column 9, line 55, delete "ink" and insert therefor --link--.

Column 12, line 51, delete "simultaneously" and insert therefor --concurrently--.

Signed and Sealed this

Fourth Day of January, 2000

Attest:

Attesting Officer

Acting Commissioner of Patents and Trademarks